May, 28, 1929.   H. PUSCAS   1,715,075
COMBINATION PASSENGER AND TRUCK BODY FOR AUTOMOBILES
Filed Oct. 19, 1927   3 Sheets-Sheet 1
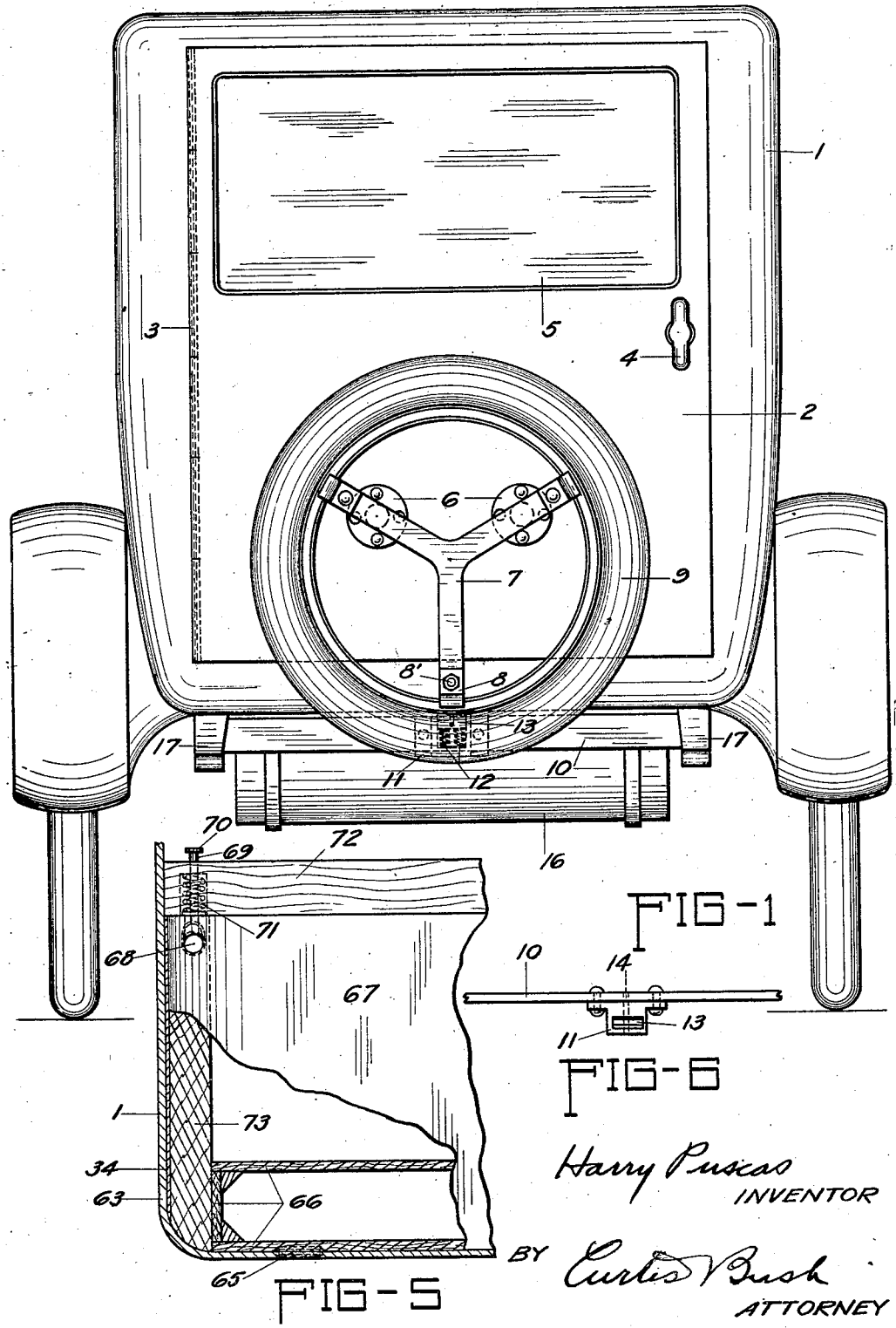

May 28, 1929. H. PUSCAS 1,715,075
COMBINATION PASSENGER AND TRUCK BODY FOR AUTOMOBILES
Filed Oct. 19, 1927 3 Sheets-Sheet 2
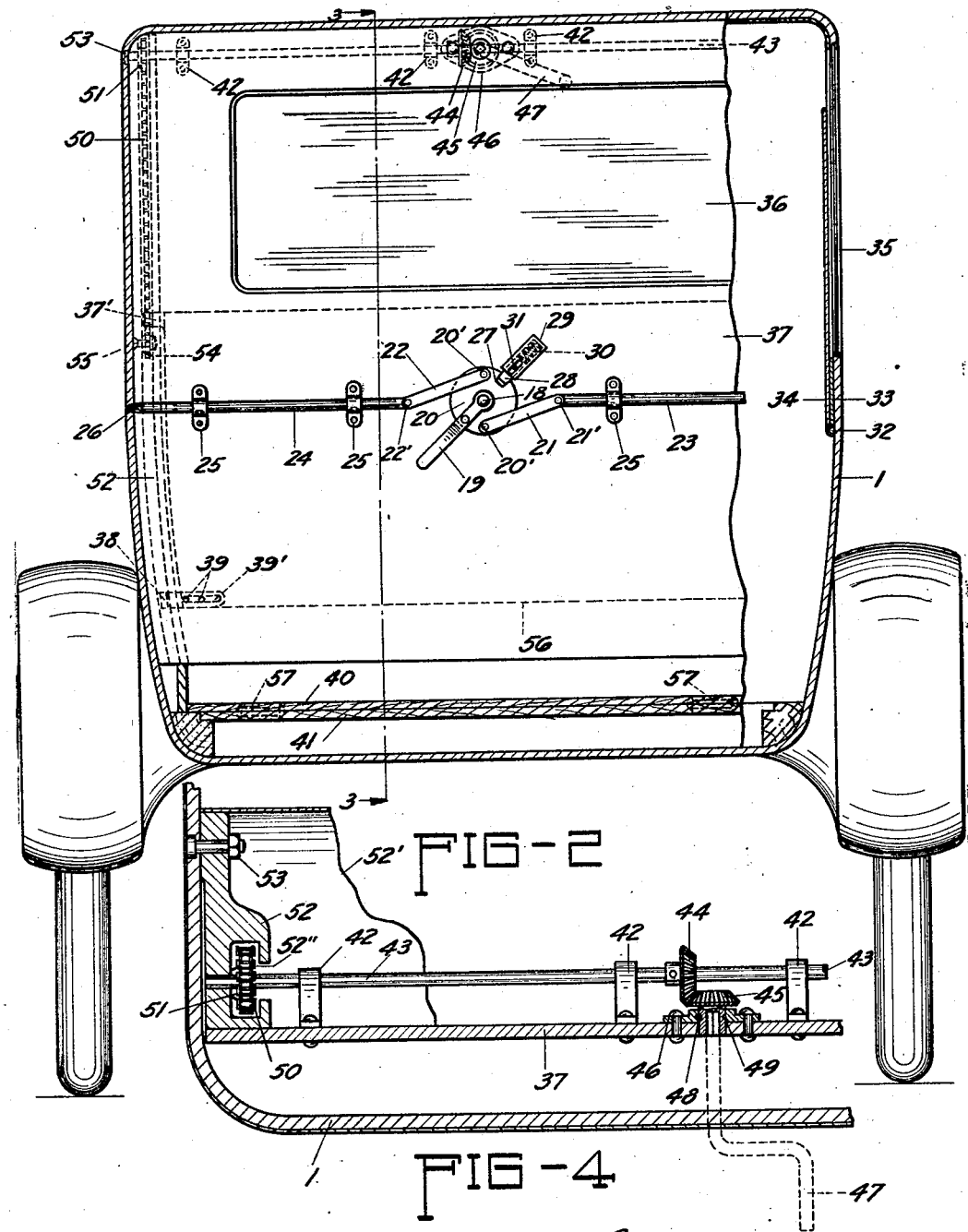
Harry Puscas INVENTOR
BY Curtis Bush
ATTORNEY May 28, 1929.  H. PUSCAS  1,715,075
COMBINATION PASSENGER AND TRUCK BODY FOR AUTOMOBILES
Filed Oct. 19, 1927  3 Sheets-Sheet 3
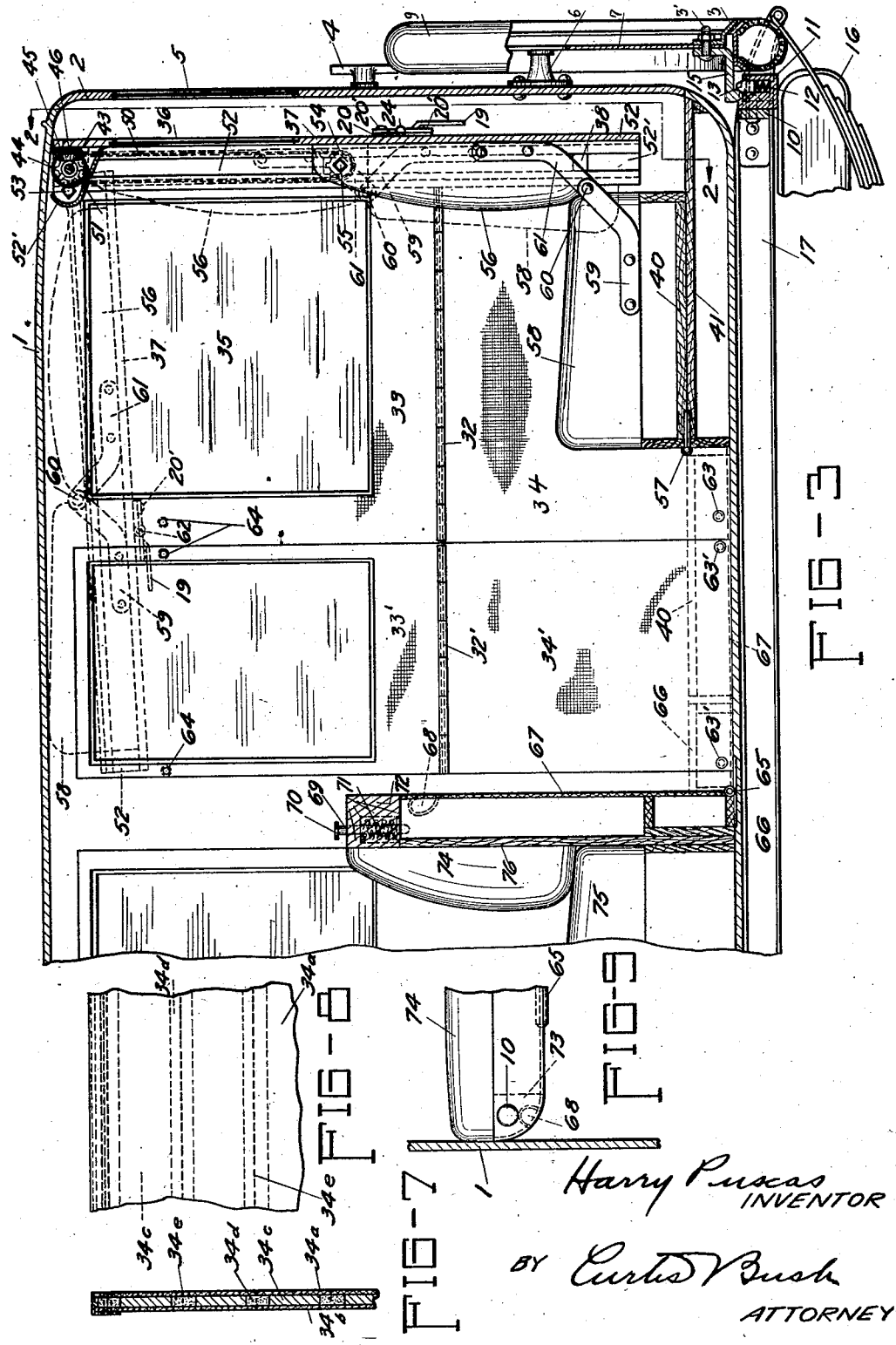
Harry Puscas
INVENTOR
BY Curtis V Bush
ATTORNEY Patented May 28, 1929.

1,715,075

UNITED STATES PATENT OFFICE.

HARRY PUSCAS, OF DAVENPORT, IOWA.

COMBINATION PASSENGER AND TRUCK BODY FOR AUTOMOBILES.

Application filed October 19, 1927. Serial No. 227,213.

My invention relates to improvements in combination passenger and truck bodies for automobiles and is applicable to closed bodies of the sedan and coach type.

The objects of my invention are:

1. To provide means for converting an automobile of the sedan or coach type into a delivery truck.

2. To provide a rear door for side door closed automobile bodies.

3. To provide a hinged support at the rear of the car for a spare tire.

4. To provide means for leveling the floors of a car when converting it from a passenger car to a truck.

I attain these objects by the mechanism illustrated in the accompanying drawings, in which,—

Figure 1 is a rear elevation showing the concealed hinges of the rear door, in dotted lines; Fig. 2 is a detail view showing the body in section on the line 2—2 of Figure 3, but for clearness omitting the chassis frame and gas tank; and at the right of the figure the false back is shown broken away to show the side upholstery in section in its upfolded position; Fig. 3 is a longitudinal vertical section on the line 3—3 of Figure 2; Fig. 4 is a detail plan view of the mechanism for raising and lowering the rear seat, with its cushions, etc.; Fig. 5 is a detail showing the latch to secure one of the lateral floor fillers in raised position; Fig. 6 is a detail showing a top view of the spare tire support; Fig. 7 shows a cross sectional view of the upholstering for the sides of the car, and Fig. 8 a detail side view of same; Fig. 9 is a detail plan view of the left end of the back of the front seat, showing one of the lateral floor fillers in its vertical position.

Similar numbers refer to similar parts throughout the several views.

My invention is applicable to closed body passenger automobiles of either the sedan or coach type and comprises a body, 1, which may be of wood, steel or other metal or a combination of both wood and metal.

The body is mounted upon the frame, 17, of the chassis in the usual manner. The back of the car is provided with a door, 2, having concealed hinges, 3, which preferably extend for the full length of the door, as the door must be strongly hinged in order to support the weight of the spare tire.

The door is provided with the usual rear window, 5, and door handle, 4, to secure same in its closed position.

Tire carrier supports, 6, are riveted to the door, with a tire carrier, 7, suitably secured thereto and the arms of the tire carrier, 7, may have rings mounted upon them to receive the rim of a spare tire or the carrier, 7, may have the ends of its arms bent at an angle to support the rim of the spare tire in any of the common methods.

A detachable clip, 8, is secured to the tire carrier, 7, by a bolt, 8', to secure the spare tire in place after it is mounted upon the carrier, 7. The tire carrier, 7, also has an arm, 15, secured at its lower end extending forwardly with its front end bent downwardly and adapted to rest upon the auxiliary tire support, 11, being secured in place thereon by a pin, 13, mounted upon a helical spring, 12, within the auxiliary tire support, 11. The auxiliary tire support, 11, is preferably bolted to the cross-member, 10, of the chassis frame.

Adjacent the rear seat of the car, a false back, 37, is provided, consisting of a framework capable of holding the upholstering in any suitable form, preferably having an inner rear window, 36, mounted therein, although it is obvious that the rear window may be omitted and the space it would normally occupy left open, as the window, 5, in the door, 2, will be sufficient for ordinary purposes.

The false back, 37, has brackets, 42, mounted at the top thereof, which form supports and bearings for the shaft, 43. The shaft, 43, has a bevel gear wheel, 44, keyed thereto, which bevel gear meshes with a corresponding bevel gear, 45, which is preferably cast integral with a hub mounted in a plate bearing, 46, which is bolted to the false back. The hub is secured in place by pins, 48 and 49, which enter corresponding grooves cut in the hub and bearing plate, 46.

The hub has a square bore extending into the outer face thereof, adapted to receive the squared end of a crank, 47, by which the bevel gear, 45, can be turned manually, which in turn will drive the bevel gear, 44, and the shaft, 43.

Guide bars, 52, are secured to the false back at either side thereof, extending vertically the full length of the false back and having a vertical T-slot, 52″, extending the full length of the inner face thereof.

T-shaped guides, 38, are mounted upon either side of the back of the rear seat and have their head portions extending into the T-slots, 52″, so as to slide vertically therein.

Near the top of the guide bars, 52, the shaft, 43, has its ends extending through the T-shaped slots and mounted in the upper ends of the guide bars, 52.

Sprocket wheels, 51, are mounted at each end of the shaft, 43, within the T-slots, 52″, of the guide bars, 52, with sprocket chains, 50, passing over the sprocket wheels, 51. At each side of the false back and midway of the height thereof, sprocket wheels, 54, are secured upon suitable bolts or pivots which engage the lower portions of the sprocket chains, 51, and around which they operate.

The rear seat back, 56, is connected to the sprocket chains, 51, so that as the sprocket wheels are revolved in one direction, the procket chains pull up the rear seat back, 56, and with it the rear seat, 58, upwardly until they extend in a vertical plane along the false back, the rear seat and rear seat back being hingedly connected together by side bars, 59 and 61, which are connected by a pivot, 60.

When the false back, 37, is in its vertical position, it is secured in place by a pair of transverse locking bars, 23 and 24, slidingly mounted in brackets, 25, and connected by links, 21 and 22, to a cam plate, 20, to which a handle, 19, is secured.

A spring-held latch, 28, is mounted in a suitable housing, 29, adjacent the circumference of the cam plate, 20. A knob, 31, is secured to the latch, 28, and a compression spring, 30, is mounted in the housing between the latch and the inner end of the housing. The cam plate, 20, is provided with a notch, 27, in which the latch, 28, may seat so as to lock it against movement.

The outer ends of the lock bars, 23 and 24, when in closed position, enter and engage corresponding openings, 26, in the sides of the body.

When desired to raise the false back, the cam plate, 20, is turned manually by use of the handle, 19, and the ends of the lock bars, 23 and 24, disengage from their seats in the body, 1. The false back is then swung forward upon the pivot bolts, 53, which pivot the upper ends of the guide bars, 52, to the body.

When the false back has reached its maximum elevation, the cam plate, 20, is again turned and the ends of the lock bars, 23 and 24, are forced outwardly into corresponding seats formed in the sides of the body, 1, or its framework. When placed in their normal locked position, the latch, 28, enters the notch, 27, in the cam plate, 20, and the false back is thus secured in its raised or horizontal position. When it is desired to return the false back and rear seat back to their normal position, the operation just described is reversed.

In some automobiles, the floor of the rear portion of the car is level, while in others there is a raised portion, as shown at 41 in Figure 3. When the rear seat rests upon a raised portion, I provide a section, 40, hinged to the raised portion, 41, at 57, and when the false back has been raised to its horizontal position, the section, 40, can be swung forward upon its hinges, 57, so as to occupy the space shown in dotted lines and fill up the floor. A similar raised section, 66, may be hinged to the floor by hinges, 65, and folded downwardly to fill up the rest of the vacant space. The section, 66, when the car is used for passenger purposes, may be folded up against the back of the front seat as shown in Figure 3, and is concealed by the upholstering, 67.

As the lower portions of the sides of an automobile body are ordinarily curved inwardly, I provide curved pieces, 73, which are secured to the hinged portion, 66, and when folded down into a horizontal position, will fill the space between section 40 and the sides of the body or the side doors. These may be secured in their vertical position by latches, 69, held into engagement with the movable parts, 73, by compression springs, 71, mounted in housings in the back of the front seat. Finger pull holes, 68, are provided in the upper portion of the movable frame, 73, and the latch, 69, is preferably provided with a head, 70, by which it can be manually operated.

The upholstering, 33 and 34, for the sides of the car and the upholstering, 33′ and 34′, for the rear side doors of the car, is preferably hinged together at 32 and 32′. Button fasteners, 63, and 63′, are formed at the lower edges of the sides and side doors respectively, which secure the lower edge of the upholstering in place when in its normal position. When the car is used as a truck, the lower edges of this upholstering are swung upwardly extending across the windows, and are held in place by button fastenings, 64, near the top of the sides of the car.

I have shown in Figures 7 and 8 the preferred form of upholstering, comprising two sheets, 34$^a$ and 34$^b$, of fabric provided with ribs, 34$^d$, which may be of felt, fiber-board or any other desired material, with the stitching, 34$^e$, to secure them in place.

It is obvious that the form, size and proportions of the various parts of my device may be varied to a considerable extent without departing from the spirit of my invention.

I claim:

1. A combination truck and passenger automobile comprising a closed body of the two-seated type, a back door hingedly mounted therein, a pair of grooved guide-bars pivoted at either side of the body near the top thereof and adjacent the back door adapted to swing from a vertical to a horizontal position, a false back secured to the guide-bars, a rear seat and seat back mounted adjacent the false back, guides secured to the rear seat back and having means slidably secured in the grooves of the guide-bars, a shaft mounted in the top of the guide-bars bearing a driven bevel gear secured near the middle thereof and upper sprocket wheels at each end thereof, corresponding lower sprocket wheels secured to the false back, sprocket chains passing over each pair of upper and lower sprocket wheels and connected to the rear seat back whereby the rear seat and back may be raised or lowered, a driving bevel gear mounted adjacent the driven gear and in mesh therewith, means for manually operating the driving bevel gear, and means for locking the guide-bars and false back in either their vertical or horizontal position as desired.

2. A combination truck and passenger automobile comprising a closed body of the two-seated type, a back door hingedly mounted therein, a pair of grooved guide-bars pivoted at either side of the body near the top thereof and adjacent the back door adapted to swing from a vertical to a horizontal position, a false back secured to the guide-bars, a rear seat and seat back mounted adjacent the false back, guides secured to the rear seat back and having means slidably secured in the grooves of the guide-bars, a shaft mounted in the top of the guide-bars bearing a driven bevel gear secured near the middle thereof and upper sprocket wheels at each end thereof, corresponding lower sprocket wheels secured to the false back, sprocket chains passing over each pair of upper and lower sprocket wheels and connected to the rear seat back whereby the rear seat and back may be raised or lowered, a driving bevel gear mounted adjacent the driven gear and in mesh therewith, a hub formed integral with the driving bevel gear containing an angular bore, and crank having one end corresponding to the angular bore of the hub and adapted to enter same, and means for locking the guide-bars and false back in either their vertical or horizontal position as desired.

In testimony whereof he affixes his signature.

HARRY PUSCAS.